United States Patent [19]

Shinjo

[11] 4,345,677

[45] Aug. 24, 1982

[54] CHUTE-HOSE COUPLER UNIT FOR AN AUTOMATIC ASSEMBLING MACHINE

[75] Inventor: Katsumi Shinjo, Osaka, Japan

[73] Assignee: Yugen Kaisha Shinjoseisakusho, Osaka, Japan

[21] Appl. No.: 184,601

[22] Filed: Sep. 5, 1980

[30] Foreign Application Priority Data

Sep. 28, 1979 [JP] Japan .................. 54-135667[U]

[51] Int. Cl.³ .............................................. B65G 11/00
[52] U.S. Cl. .................................................. 193/2 A
[58] Field of Search ............ 193/2 R, 2 A, 32, 25 FT, 193/25 E; 29/822, 823; 285/320, 317, 7

[56] References Cited

U.S. PATENT DOCUMENTS

| 1,253,309 | 1/1918 | Ulleland | 285/320 |
| 2,245,151 | 6/1941 | Martinet | 285/7 |
| 2,546,387 | 3/1951 | Coffine | 285/317 X |
| 2,727,762 | 12/1955 | Ziegler | 285/7 |
| 3,107,767 | 10/1963 | Medoff et al. | 193/25 FT |
| 3,956,812 | 5/1976 | Kawakami et al. | 193/2 A |

Primary Examiner—Robert B. Reeves
Assistant Examiner—Gene A. Church
Attorney, Agent, or Firm—Jordan and Hamburg

[57] ABSTRACT

A chute-hose coupler unit includes a first coupler and a second coupler each adapted to be detachably connected to ends of the respective chute-hoses, each coupler including a leaf spring which has a stop pin provided in its free flexible portion, and additionally including a cam means adapted to slide under the leaf spring of the mating coupler, the stop pin having a tendency of being inserted into the chute-hoses under the urge of the leaf springs, thereby blocking the component parts in the chute-hoses against dropping out of the open ends of the couplers when the couplers are disconnected from each other.

1 Claim, 6 Drawing Figures

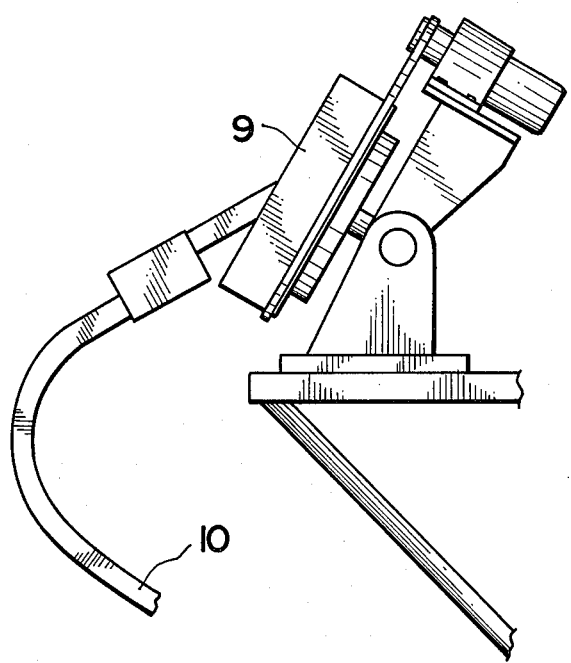
FIG.1
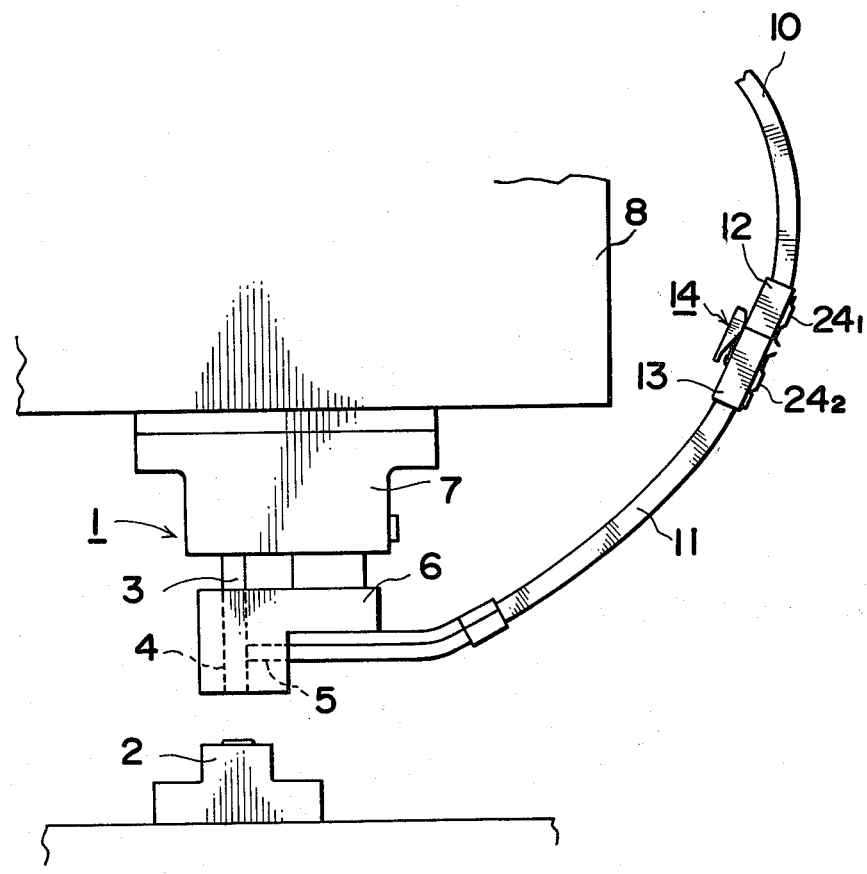

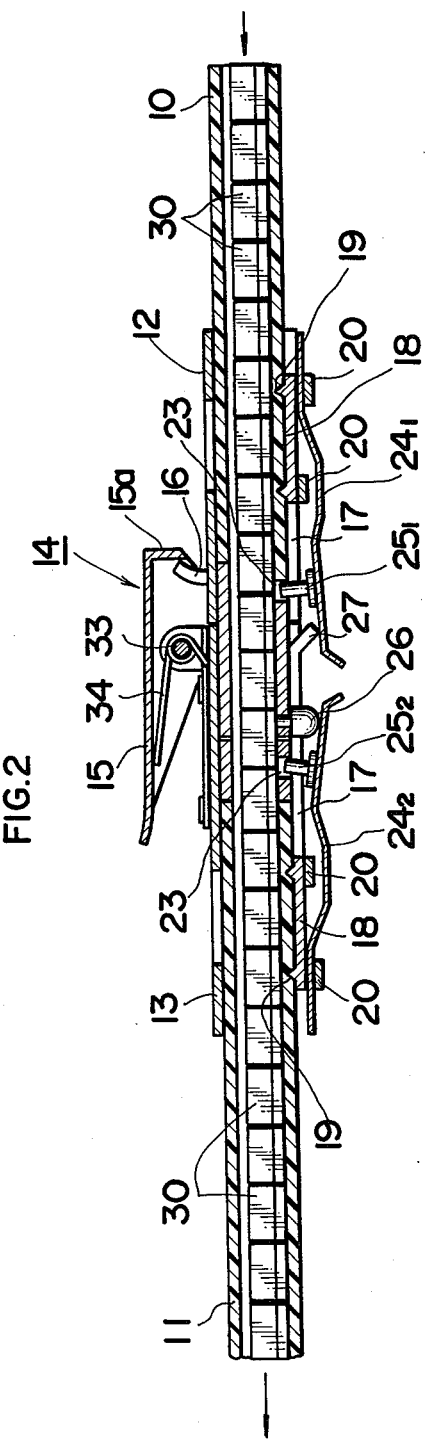
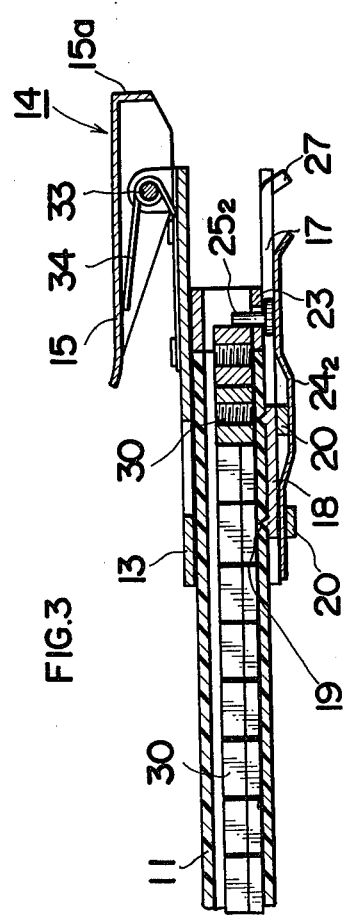
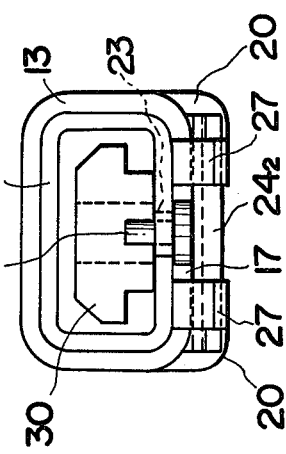

CHUTE-HOSE COUPLER UNIT FOR AN AUTOMATIC ASSEMBLING MACHINE

BACKGROUND OF THE INVENTION

1. Field of the Invention

The present invention relates to a chute-hose coupler unit for use in association with an automatic assembling machine. More particularly, the present invention relates to a chute-hose coupler unit capable of ready connection and disconnection without letting out the component parts contained in the chute-hoses.

2. Description of the Prior Art

It is generally known in the art that small components, such as piercing nuts, are automatically anchored in metal panels to assemble motor cars and electric appliances from part to part. For example, the piercing nut includes a pilot portion at the center of a top surface thereof, the pilot portion being designed to function as a piercing punch when applied against a metal panel so as to punch its own installation aperture in the metal panel. The pilot portion is secured in the self-pierced installation aperture by a swaging operation. For this purpose, the pilot portion is applied to the metal panel placed on a swaging die. Compression force is then applied to the piercing nut to punch the installation aperture, thereby enabling the same to anchor to the metal panel.

Under such an automatic assembling system it is essential to supply piercing nuts in succession to the assembling machine, and in order to ensure a continuous supply of the same it is common to employ a chute-hose, mostly flexible, extending from a supply magazine to the assembling machine. In such cases the chute-hoses are connected to extend the length with the use of one or more couplers. The trouble is, however, that when the hoses are connected or disconnected, the nuts therein are likely to drop out of the open ends thereof. This leads to the waste of labor and material, and in fact decreases the working efficiency.

The present invention aims at solving the problems mentioned above, and has for its object to provide an improved coupler unit capable of ready connection and disconnection without letting out the component parts contained therein.

Other objects and advantages will become apparent from the following description when taken in connection with the accompanying drawings.

SUMMARY OF THE INVENTION

According to one advantageous aspect of the present invention, a chute-hose coupler unit includes a first coupler and a second coupler each adapted to be detachably connected to ends of the respective chute-hoses, each coupler including a leaf spring which has a stop pin provided in its free flexible portion, and additionally including a cam means adapted to slide under the leaf spring of the mating coupler, the stop pin having a tendency of being inserted into the chute-hoses under the urge of the leaf springs, thereby blocking the component parts in the chute-hoses against dropping out of the open ends of the couplers when the couplers are disconnected from each other.

BRIEF DESCRIPTION OF THE DRAWINGS

FIG. 1 is a schematic side view, partly omitted, showing an automatic assembling machine including a chute-hose coupler unit constructed in accordance with the present invention;

FIG. 2 is vertical cross-section on an enlarged scale through the chute-hose coupler unit in FIG. 1;

FIG. 3 is a vertical cross-section through the leaf-hand coupler in FIG. 2, when it is disconnected from the other coupler;

FIG. 4 is an end view on an enlarged scale of the coupler in FIG. 3;

DETAILED DESCRIPTION OF THE INVENTION

Figure 5:
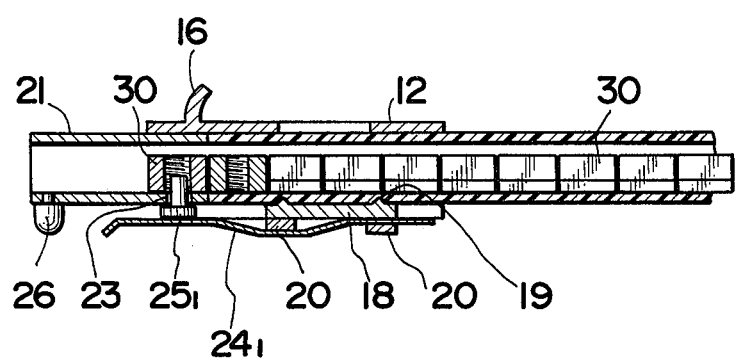
FIG. 5 is a vertical cross-section through the right-hand coupler in FIG. 2.

Referring to FIG. 1 reference numeral 1 designates an assembling section, which includes a die 2, a punch 3 reciprocally movable through a bore 4, and a nut holding block 6 including a nut supplying passage 5. The punch 3 and the nut holding block 6 are carried on a ram 8 through a holder 7, thereby enabling the punch and the nut holding block to move up and down in accordance with the movement of the ram, wherein the movement of the nut holding block is limited to a given vertical range. Normally, the assembling section 1 is incorporated in a set together with other dies, and as a whole they are carried on the ram 8.

Reference numeral 9 designates an nut arranging unit in which nuts are arranged into a uniform posture to ensure a trouble-free feeding thereof into a chute-hose 10. The chute-hose 10 is coupled to a second chute-hose 11 by means of couplers 12 and 13, wherein the second chute-hose is directly connected to the nut holding block 6. Each chute-hose 10 and 11 is made of resilient plastics, and is constructed to be rectangular in cross-section. The coupler 12 is connected to the chute-hose 10 while the coupler 13 is connected to the chute-hose 11, wherein the coupler 12 has external threads while the coupler 13 has internal threads. These threads interlock with each other to effect a connection thereof. The couplers 12 and 13 can be quickly and readily connected and disconnected by means of a locking unit 14.

Referring to FIGS. 2 and 3, the locking unit 14 includes a lever 15 pivotally connected to the coupler 13 by means of a pivot 33, wherein the lever is normally raised at its tail under the action of a spring 34, as shown in FIGS. 2 and 3. The locking unit 14 also includes a pawl 16 adapted to engage with a bended portion 15a of the lever 15 so as to lock the lever in its raised posture, wherein the pawl 16 is erected on the coupler 12. The couplers 12 and 13 are connected to each other when the bended portion 15a of the lever is caught by the pawl 16, and they are disconnected from each other when the bended portion 15a is released from the pawl by lowering the tail portion of the lever 15 against the spring 34.

Each coupler 12 and 13 is formed by an inverted rectangular open-topped short channel section with inturned lips, between which a lengthwise opening 17 is formed. Thus an terminating end portion of the rectangular chute-hose is tightly inserted into the coupler. In order to strengthen the connection of the coupler and the chute-hose, an inserter 18 is preferably inserted into the opening 17, wherein the inserter has projections 19 at four corners. The inserter is facedly applied to the chute-hose with its projections against the walls thereof. The inserter 18 is firmly held by means of a press member 20 provided on the coupler. The coupler 12 has a sleeve 21 half inserted into its terminating end portion, wherein the sleeve has a substantially same cross-section as that of the chute-hose 10.

The coupler 13 has a relatively short second sleeve 22 inserted therein, wherein the second sleeve has the same cross section as that of the first sleeve 21. When the couplers 12 and 13 are to be connected, the first sleeve 21 is inserted into the coupler 13 until the same comes into abutment with the second sleeve 22.

Figure 6:
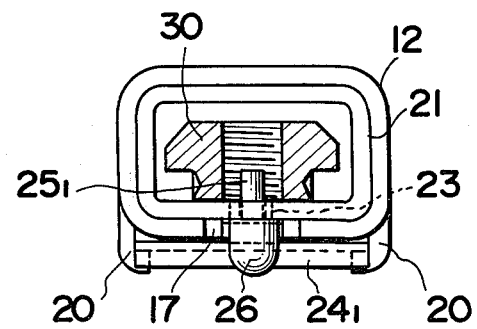
FIG. 6 is an end view on an enlarged scale of the coupler in FIG. 5.

Each coupler 12 and 13 is provided with leaf springs $24_1$ and $24_2$ respectively, wherein each leaf spring is secured to the respective coupler such that it has its free flexible end at a point adjacent to the open end of the coupler. The leaf springs $24_1$ and $24_2$ are provided with stop pins $25_1$ and $25_2$, respectively, in their free flexible surfaces. As shown in FIGS. 4 and 6, these stop pins are insertable into the chute-hoses through apertures 23, thereby preventing the nuts 30 therein from dropping out of the open ends of the couplers when the couplers are disconnected from each other. FIGS. 3 and 5 show that the nut 30 is effectively blocked against falling by the stop pins 25 and $25_1$ protruded into the chute-hoses under the urge of the leaf springs.

The sleeve 21 is provided with a cam projection 26 in the undersurface of the terminating end thereof as shown in FIG. 6. The coupler 13 is provided with a cam piece 27 in the terminating end portion thereof. The cam projection and cam piece are to raise their opposite leaf springs so as to withdraw each stop pin $25_2$ and $25_1$ from inside the chute-hoses. FIG. 2 shows that the couplers 12 and 13 are connected to each other in which the cam members are inserted under the leaf springs. When the stop pins are withdrawn, the passageway of nuts in the chute-hoses are restored, thereby allowing the same to be effectively fed therethrough.

However, when the couplers 12 and 13 are disconnected from each others, the cam members 26 and 27 are disengaged from the leaf springs $24_2$ and $24_1$, respectively, thereby returning the stop pins $25_2$ and $25_1$ into the chute-hoses. Thus the nuts therein are effectively blocked against dropping out of the open ends of the chute-hoses. In this case, however, it is unavoidable that a few nuts located between the two stop pins fall off. But it is a negligible loss even if they are not collected.

What is claimed is:

1. A chute-hose coupler unit used for an automatic assembling machine, the unit comprising:
   a first coupler adapted to be detachably connected to an end of a first chute-hose;
   a second coupler adapted to be detachably connected to an end of a second chute-hose;
   said first coupler including a first leaf spring which has its free flexible end at a point adjacent to the open end of said first coupler;
   said second coupler including a second leaf spring which has its free flexible end at a point adjacent to the open end of said second coupler;
   said each leaf spring including a stop pin in its free flexible end portion, said stop pin having a tendency of being inserted into said chute-hoses under the urge of said leaf springs so as to block the component parts therein against dropping out of the open ends of said couplers when said couplers are disconnected from each other;
   said first coupler including a first cam means adapted to slide under said second leaf spring; and
   said second coupler including a second cams means adapted to slide under said first leaf spring.

* * * * *